(12) United States Patent
Deng

(10) Patent No.: US 6,347,097 B1
(45) Date of Patent: Feb. 12, 2002

(54) METHOD AND APPARATUS FOR BUFFERING RECEIVED DATA FROM A SERIAL BUS

(75) Inventor: Brian T. Deng, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/205,892

(22) Filed: Dec. 4, 1998

Related U.S. Application Data

(60) Provisional application No. 60/067,615, filed on Dec. 5, 1997.

(51) Int. Cl.[7] .................................................. H04J 3/00
(52) U.S. Cl. ......................... 370/498; 710/100; 710/52; 711/173
(58) Field of Search ............................... 370/402, 395.4, 370/438, 458, 489, 450, 451, 498, 502; 710/100, 112, 113, 52; 711/100, 147, 153, 154, 156, 170, 173

(56) References Cited

U.S. PATENT DOCUMENTS

| | | | | |
|---|---|---|---|---|
| 5,845,152 A | * | 12/1998 | Anderson et al. .............. | 710/52 |
| 5,996,032 A | * | 11/1999 | Baker .......................... | 710/62 |
| 6,006,286 A | * | 12/1999 | Baker et al. .................. | 710/22 |
| 6,081,852 A | * | 6/2000 | Baker .......................... | 710/24 |

* cited by examiner

Primary Examiner—David R. Vincent
(74) Attorney, Agent, or Firm—W. James Brady; Frederick J. Telecky, Jr.

(57) ABSTRACT

A method for reading data from an IEEE 1394 serial bus system and storing the data in a FIFO includes partitioning the FIFO into a plurality of registers, each having 32 register bits for the data and a single register bit for a control data bit. To manipulate the system such that reads on a data quadlet involve only one system read on a 32-bit system, a packet token is stored in the initial register in a data packet. This packet token includes the quadlet count in the data packet. The host system need only read the first register in the data packet, the packet token, to determine the number of data quadlets within the data packet. Thereafter, the control data bit need not be read such that only a single read operation is performed for each operation of the read pointer. The last register associated with the packet is the acknowledge register which contains information that is sent back to the transmit node in the system. Further, each data packet can be divided into partitions with a plurality of packet tokens. Each packet token has a defined quadlet count associated therewith, the packet tokens disposed at the beginning of each partition. The last partition has a Complete bit set equal to "1" to define that as a the last partition. In this last packet token, the acknowledge signal is stored.

21 Claims, 6 Drawing Sheets

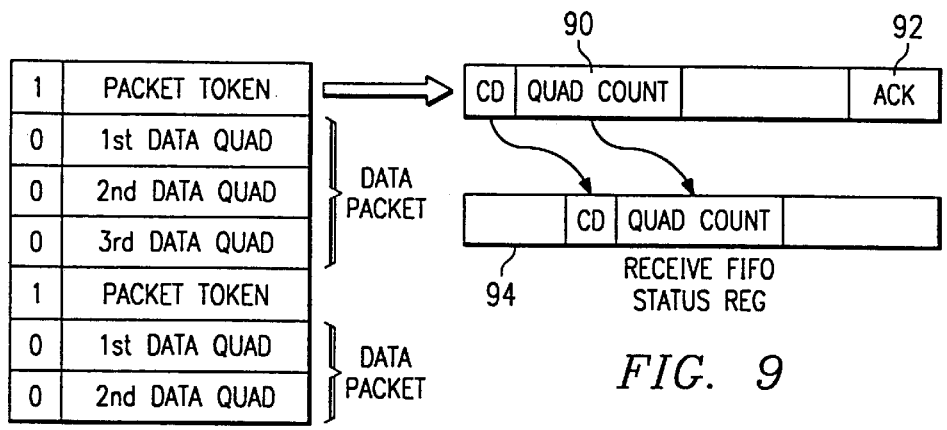
FIG. 9
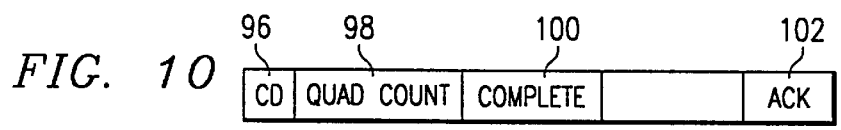
FIG. 10
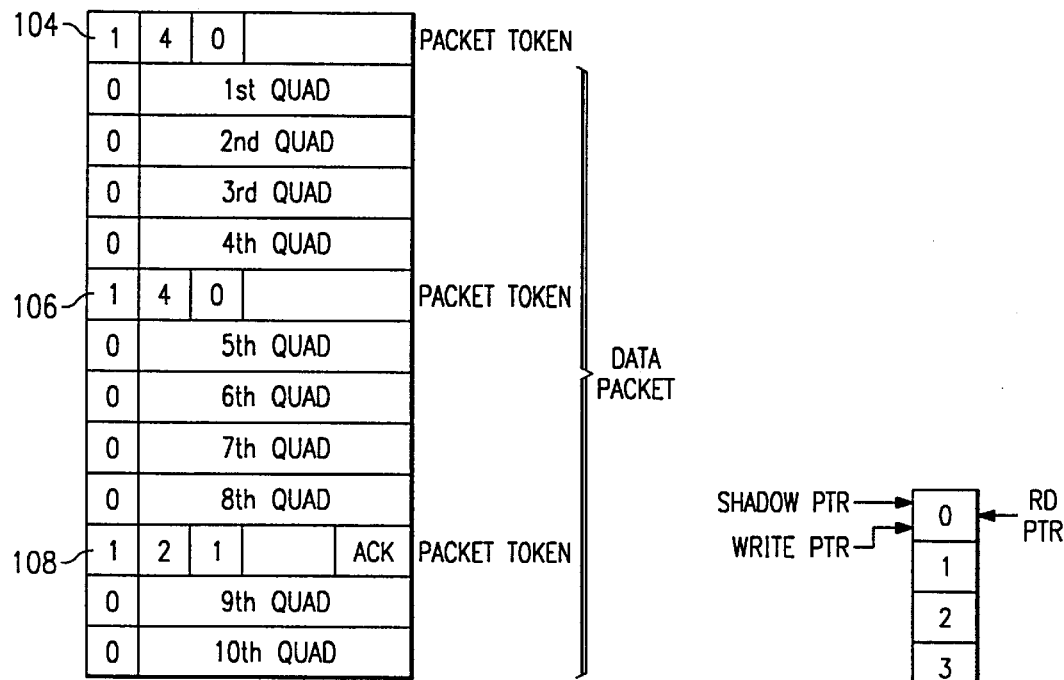
FIG. 11
FIG. 12

METHOD AND APPARATUS FOR BUFFERING RECEIVED DATA FROM A SERIAL BUS

This application claims priority under 35 USC §119(e)(1) of provisional application No. 60/067,615 filed Dec. 5, 1997.

TECHNICAL FIELD OF THE INVENTION

The present invention pertains in general to receiving data from a serial bus and, more particularly, to a method for storing the data in a FIFO and retrieving the data therefrom in an IEEE 1394 serial bus system.

BACKGROUND OF THE INVENTION

The IEEE has proposed a new standard under IEEE 1394 for a high-performance serial bus cable environment that includes a network of logical nodes connected by point-to-point links called physical connections. The physical connections consist of a port on each of the nodes and a cable disposed therebetween. A node can have multiple ports, which allows a branching multi-hop interconnect. The limitations on this topology are set by the requirement for the fixed round-trip time required for the arbitration protocol. The default timing set after a bus reset is adequate for 16 cable hops, each of 4.5 meters for a total of 72 meters. The maximum number of nodes supported on a single bus is 63.

Whenever a node is added to or removed from the 1394 serial bus, a bus reset occurs and forces all nodes to a known state. After a bus reset, the tree identify (ID) process translates the general network topology into a tree, where one node is designated a root, and all the physical connections are labeled as either a parent, a child or as unconnected. The unconnected ports are labeled as "off" and do not participate any further. The tree must be acyclic, meaning no loops allowed; otherwise, the tree ID process will not be completed.

The 1394 cable environment supports multiple data rates of 98.304, 196.608, 393.216 megabits per second. The lowest speed is known as the base rate, and all ports that support a higher data rate must also support the lower data rate. Nodes capable of data rates greater than the base rate exchange speed information with its peers through its attach ports during the speed signaling phase of normal bus arbitration. If a peer node is incapable of receiving high-speed data, then data will not propagate down that path. Data will only be propagated down paths that support the higher data rate.

During data packet transmission, the source node sends a speed code, format and transaction codes, addresses of the source and destination nodes and data in a packet form. The destination field in this packet is utilized by each node's link layer to determine if it is the recipient of the transmitted data. The maximum speed at which a data packet can be transmitted depends upon the bus topology and the data transmission speed supported by the nodes on the bus. To determine the optimum speed at which a data packet may be sent, the maximum supported speeds of the transmitting and receiving nodes, as well as the maximum speeds of any nodes connected between these nodes, must be determined. The optimum speed for data transmission is equal to the highest speed which is supported by all the nodes, which are required to participate in the transmission of the data packet.

The IEEE 1394 bus operates within a 32-bit environment. Data is transmitted in "quadlets," which are comprised of four bytes of data. At the receive end, these 32-bit quadlets are received and transferred to the host system bus. However, there is an interchange that takes place between the receiving layer and the transmitting layer which requires the receiving layer to receive the various data quadlets and buffer them before receiving the next data quadlets. Additionally, after all the data quadlets in a given packet are received, there is performed an error check on the data which is facilitated by including in the packet a CRC quadlet. If the data is in error, then an acknowledgment signal is sent back to the transmitting layer to indicate that the data was not received correctly. However, since this data is not totally buffered, this can present a problem with having to receive all of the quadlets prior to performing the error checking. To facilitate this data receiving operation, a FIFO (first in, first out) buffer has been utilized for storing the data. To store the data as discrete packets in a FIFO, it is necessary to associate a controlled data bit with each quadlet, this controlled bit therefore increasing the width of the FIFO to 33 bits. Since it is 33 bits, the host system must perform two reads for each quadlet retrieved from the FIFO. Typically, a "1" control data bit indicates the beginning of a data packet, and the end of a data packet with the weight "0" indicating intermediate data quadlets. The last registered position in the FIFO for a given data packet essentially constitutes the acknowledge signal that is sent back to the transmitting node.

SUMMARY OF THE INVENTION

The present invention disclosed and claimed herein comprises a method and apparatus for buffering received packetized data from a serial bus. The initiation of receipt of a given packet of data is first recognized, and then storage thereof initiated by storing the received data from the packet in a first packet data storage location in a FIFO. Subsequent received data is then stored in additional packet data storage locations in the FIFO as they are received. The end of a given packet data is then recognized and, after this event, a packet token is generated. The packet token contains information as to the packet data storage locations within the FIFO associated with the packet data. This packet data token is stored in the FIFO in such a manner that, upon reading a packet of data by a host system from the FIFO, the packet token will be read first to provide information to the host system as to the packet data storage locations of the remaining data in the stored packet.

In another aspect of the present invention, the packet data storage locations are sequential in nature and adjacent to each other such that a read operation need only increment a Read pointer in the FIFO from one location to the next. The packet data storage location has a width that is equal to the width of the data bus in the host system such that a single read is required to read the contents of the packet data storage location. For each packet data storage location, there is associated therewith a control field that defines the relative location of a packet data storage location within the received packet. The packet token is stored in a packet data storage location that precedes the first packet data storage location for the received packet. The control field associated with the packet token indicates that it is the first packet data storage location associated with the given packet. The host system reads the packet token with two read operations, a first read operation for the packet data storage location and a second read operation for the control field. Once the number of packet locations associated with the packet to be read is determined, only a single read is required for each subsequent data location until a number of packet data storage locations equal to the number indicated by the packet token is read.

BRIEF DESCRIPTION OF THE DRAWINGS

For a more complete understanding of the present invention and the advantages thereof, reference is now made to the following description taken in conjunction with the accompanying Drawings in which:

FIG. 9 illustrates one embodiment of the method for storing data in the FIFO of the present invention;

FIG. 10 illustrates the packet token for an alternate embodiment;

FIGURE 11 illustrates the FIFO map for the alternate embodiment associated with FIG. 10;

FIG. 12 illustrates a map of the FIFO location showing the shadow pointer, write pointer and read pointer;

DETAILED DESCRIPTION OF THE INVENTION

Figure 1:
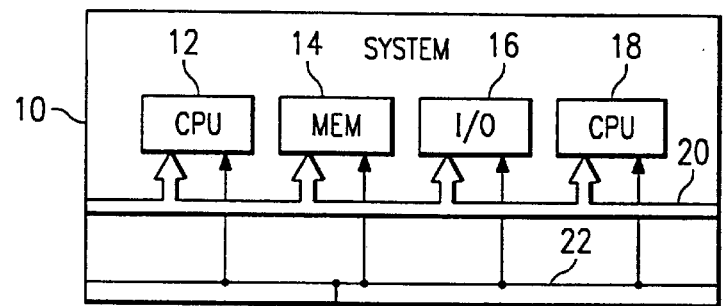
FIG. 1 illustrates an overall block diagram of a system utilizing the IEEE 1394 serial bus architecture.
Figure 1:
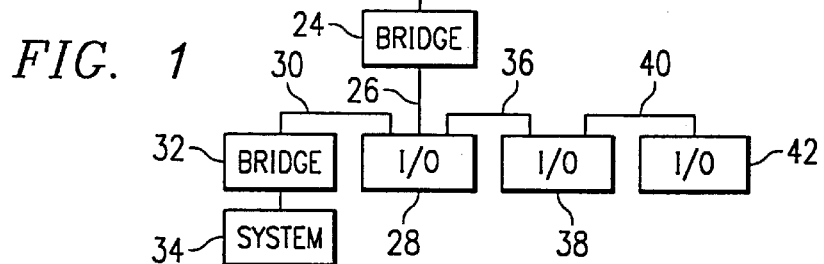

Referring now to FIG. 1, there is illustrated a block diagram of a system utilizing the serial bus architecture that is defined as the IEEE 1394 serial bus. This is defined in the "IEEE Standard for a High-Performance Serial Bus," IEEE STD 1394–1995, which is incorporated herein by reference. A module 10 is illustrated, which module 10 includes a CPU 12, a memory 14, an input/output (I/O) 16 and a CPU 18. The CPU 12, memory 14, I/O 16 and CPU 18 all comprise units within the system. Each of the units 12–18 interfaces with a parallel bus 20, which is a system bus that is indigenous to the module 10. In addition, each of the units 12–18 interfaces with a serial bus 22 which is referred to as a "backplane." The serial bus 22 operates in accordance with the IEEE 1394 standard and is also interfaced external to the system with a bridge 24. The bridge 24 and the module 10 each comprise logical nodes on the serial bus. In general, the serial bus architecture is defined in terms of logical nodes, the node being an addressable entity. Each of those can be independently reset and identified, and more than one node may reside on a single module, and more than one unit may reside in a single node. A node is therefore a logical addressing concept wherein a module is a physical device which can consist of more than one node that share a physical interface. The address space of a single node can be directly mapped to one or more units. A unit can be a logical entity, such as a disk controller, memory, CPU, etc. Within a given unit, there may be multiple subunits, which can be accessed through independent control registers or uniquely addressed with direct memory access (DMA) command sequences.

Referring further to FIG. 1, it can be seen that there are two environments, one within the module 10 utilizing the backplane 22, referred to as the "backplane environment," and the other being a "cable environment." The nodes interfacing with the cable environment have "ports" associated therewith. The bridge node 24 is such a node which interfaces on one side to the backplane serial bus 22 and on the other side to a cable 26 which interfaces to a single I/O node 28 through one port therein. The I/O node 28 has two other ports, one of which is connected through a cable serial bus 30 to a bridge node 32. The bridge node 32 is similar to the bridge node 24 in that it interfaces with another system 34, this being a module. The system node 34 can be substantially identical to the system 10, or any other type of system employing a backplane. The third port of the I/O node 28 interfaces through a cable serial bus 36 to one port of an I/O node 38, the other port thereof interfaced through a cable serial bus 40 to an I/O node 42.

The cable environment in general is a physical topology that provides a noncyclic network with finite branches and extent. The medium consists of two conductor pairs for signals and one pair for power and ground that connect ports on different nodes. Each port consists of terminators, transceivers, and simple logic. The cable and ports act as bus repeaters between the nodes to simulate a single logical bus. The backplane environment, by comparison, comprises a multidrop bus. This consists of two single-ended conductors running the length of the backplane in the module. Connectors distributed along the bus allow nodes to "plug into" the bus. This system makes use of wired-OR logic that allows all nodes to assert the bus.

Figure 2:
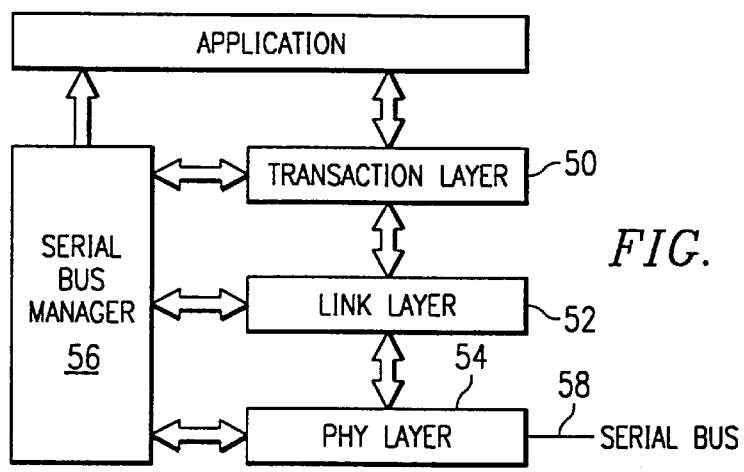
FIG. 2 illustrates a simplified block diagram of the various protocol layers in the IEEE 1394 bus.

Referring now to FIG. 2, there is illustrated a block diagram of the serial bus protocol. The serial bus protocol is comprised of three stack layers, a transaction layer 50, a link layer 52 and a physical layer 54 labeled "PHY." The transaction layer defines a complete request-response protocol to perform the bus transactions required to support the CSR architecture (control and status registers). This provides operations of read, write and lock. The link layer 52 provides an acknowledge datagram (a one-way data transfer with confirmation of request) service to the transaction layer 50. It provides addressing, data checking, and data framing for packet transmission and reception. The link layer 52 also provides an isochronous data transfer service directly to the application, including the generation of a "cycle" signal utilized for timing and synchronization. One link layer transfer is called a "subaction."

The physical layer 54 provides three major functions. It translates the logical symbols utilized by the link layer 52 into electrical signals on the different serial bus media. It guarantees that only one node at a time is sending data over the bus by providing an arbitration service. It also defines the mechanical interfaces for the serial bus. For each environment, there is provided a different physical layer, the cable and backplane environments. The cable physical layer also provides a data resynch and repeat service and automatic bus initialization.

In addition to the three layers, there is also provided a serial bus management block 56 that provides the basic control functions and standard CSRs needed to control nodes or to manage bus resources. This includes a number of components, a bus manager component which is only active at a single node that exercises management responsibilities over an entire bus, a node controller component, and an isochronous resource manager that centralizes the services needed to allocate data with another isochronous resource. An isochronous resource is a resource having the characteristics of a time-scale or signal that has time intervals between consecutive significant instances with either the same duration or durations that are integral multiples of the shortest duration. For the purposes of the present invention, the physical layer interfacing with the serial bus 58 and the link layer 52 will be interfaced with a receive buffer (not shown).

Figure 3:
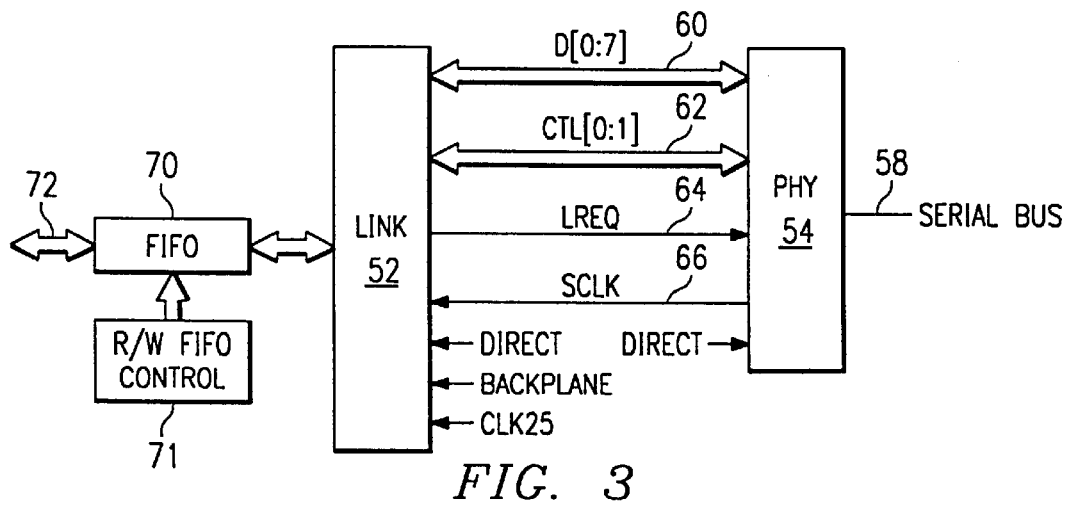
FIG. 3 illustrates a more detailed block diagram of the physical and link layers which interface with the FIFO.

Referring now to FIG. 3, there is illustrated a block diagram of the interface between the physical layer 54 and the link layer 52. The physical layer 54 interfaces with the serial bus 58 and is operable to receive data therefrom. Data is passed to and from the link layer 52 through an 8-bit bi-directional data bus 60. Two control bits are passed between the physical layer 54 and the link layer 52 over a control bus 62. A link request is transferred to the physical 54 from the link layer 52 through a request line 64, but with a system clock signal, SCLK, transferred from the physical layer 54 to the link layer 52, the physical layer 54 recovering this clock.

Hereinafter, proposed data rates are referred to in multiples of 98.304 Mbit/s. The interface provided in the IEEE 1394 in the cable environment will support the following data rates: 100 Mbit/s, 200 Mbit/s and 400 Mbit/s. The backplane environment will support 25 Mbit/s and 50 Mbit/s. These rates are actually "bit" rates, independent of the encoding scheme. The actual clock rate in a redundant encoding scheme is referred to as a "baud" rate and is independent of the clock rate of this interface.

The physical layer 54 has control over the bi-directional pins for transferring the data and the control bits. The link layer 52 only drives these pins when control is transferred to it by the physical layer 54. The link performs all unsolicited activities through a dedicated request pin on line 64. The possible actions that may occur on the interface are categorized as transmit, receive, status and request. The SCLK is driven by the physical layer 54 and is generally synched to the serial bus clock at a rate of 49.152 MHz. There is provided a backplane input on the link layer 52 which, if set high, indicates that the physical layer is in a backplane environment. Another input, a CLK25 input, when set high, forces the SCLK output from the physical layer 54 on the line 66 to a value of 24.576 MHz.

When data is carried between the two chips, the width of the data bus 60 depends on the maximum speed of the connected physical layer 54, two bits for every 100 Mbit/s. Therefore, packet data for a 100 Mbit/s transmit utilizes D[0:1], 200 Mbit/s transfers utilize D[0:3], and 400 Mbit/s transfers utilize the full D[0:7]. The unused D[n] signals are driven low. The control bus 62 always carries two bits. Whenever control is transferred between the physical layer 54 and the link layer 52, the side surrendering control always drives the control and data pins to a logic "0" level for one clocks before tri-stating its output buffers.

As noted above, there are four basic operations that may occur in the interface: request, status, transmit and receive. To request the bus or access a register in the physical layer 54, the link layer 52 sends a short serial stream to the physical layer 54 on the request pin 64. When the physical layer 54 has status information to transfer to the link layer 52, it will initiate a status transfer. The physical layer 54 will wait until the interface is idle to perform this transfer, and it will initiate the transfer by asserting a status bit on the control bus 62. It will also provide at the same time the first two bits of status information on D[0:1]. When the link requests access to the serial bus through the request line 64, the physical layer 54 arbitrates for access to the serial bus 58. When it wins the arbitration, it will then grant the bus to the link layer 52 by asserting "transmit" on the control bus 62 for one cycle of the SClk. It will then be idle for a single cycle. After sampling the "transmit" state from physical layer 54, the link layer 52 will then take over control of the interface by asserting either a "hold" or a "transmit" on the control bus 62. During a receive operation, whenever the physical layer 54 sees a "data-n" state on the serial bus 58, it initiates a receive operation by asserting "receive" on the control bus 62 and a logic "1" on each of the data pins. Physical layer 54 then indicates the start of a packet by placing the speed code on the data pins. For 100 Mbit/s, the data bits will be "00xxxxxx," and for 200 Mbit/s, it will be "00100xxxx," with 400 Mbit/s being "01010000," the value "x" being a non operation.

The link layer 52 will interface with a buffer in the form of a FIFO 70, which is controlled by a read/write FIFO control block 71 that defines the position of the read and write pointers and all accesses in and out of the FIFO. The other side of the FIFO 70 is interfaced with the host bus 72, which host bus 72 is a 32-bit bus.

Figure 4:
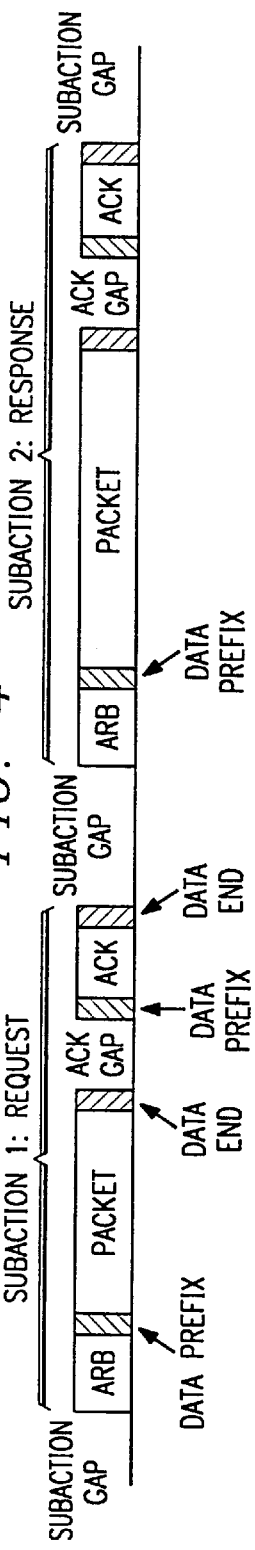
FIG. 4 illustrates an example of an asynchronous transmission over the serial bus.

Referring now to FIG. 4, there is illustrated a subaction in the link layer 52 for an asynchronous transmission of a packet. This subaction is in the form of a request and a response. There is provided an arbitration sequence which is transmitted by a node that wishes to transmit a packet, this being transmitted to the physical layer 54 to gain control of the bus 58. The physical layer 54 may then respond immediately if it already controls the bus. This is followed by a data packet transmission which, for asynchronous subactions, involves the source node sending a data prefix signal (including a speed code, if needed), addresses of the source node and destination nodes, a transaction code, a transaction label, a retry code, data, one or two cyclic redundancy checks (CRCs), and a packet termination (either another data prefix or a data end signal). This is all followed by an acknowledgment field wherein a uniquely addressed destination returns a code indicating to the transmitting node the action taken by the packet receiver. Each of these asynchronous subactions is separated by periods of idle bus called "subaction gaps." This gap is disposed between the packet transmission and acknowledgment reception. This "ack-gap" is of varying lengths depending upon where the receiver is on the bus with respect to the senders of the link request and acknowledgment (ack). However, the maximum length of the ack-gap is sufficiently shorter than a subaction gap to ensure that other nodes on the bus will not begin arbitration before the acknowledgment has been received.

Figure 5:
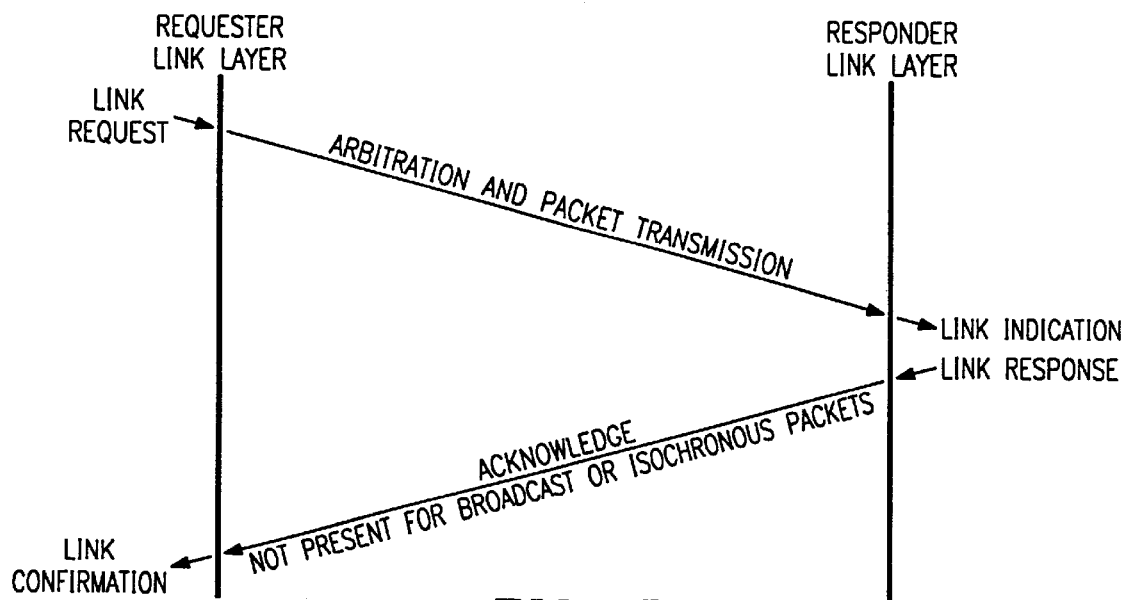
FIG. 5 illustrates a diagrammatic view of how the link layer services a transaction.

Referring now to FIG. 5, there is illustrated a diagrammatic view of the manner in which the link layer 52 services a request. As noted above, the link layer 52 utilizes the request, indication, response and confirmation service primitives. The request primitive is utilized by a link requestor to transfer the packet to a link responder. An indication primitive indicates the reception of a packet by a link responder. A response primitive indicates the transmission of an acknowledgment by a link responder, and the confirmation primitive indicates the reception of the acknowledgment by the link requestor. Once the link request has been made, the system goes through an arbitration and packet transmission to the receiving node, which then provides a response back in the form of an acknowledgment to the requesting link layer, which will then confirm transmission.

Figure 6:
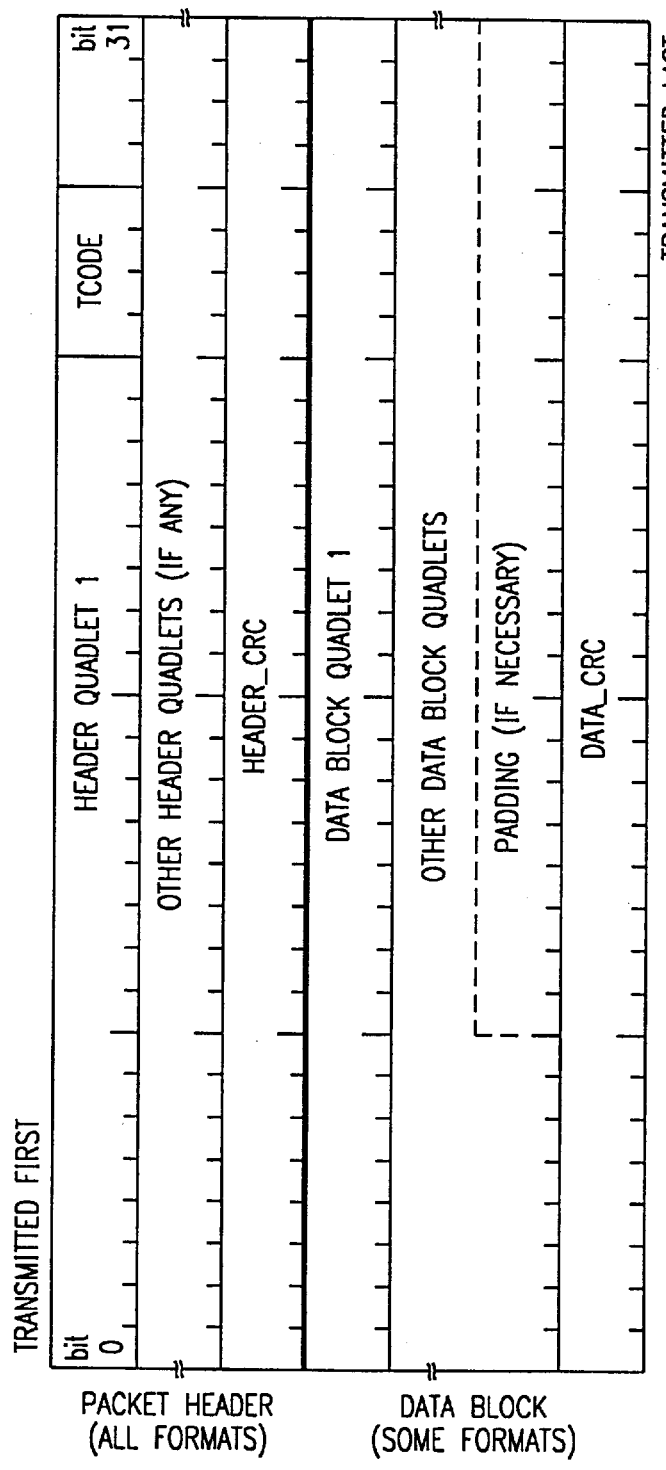
FIG. 6 illustrates a primary packet data format.

Referring now to FIG. 6, there is illustrated a register map for a packet that is transmitted. The packet is configured with a header that contains a plurality of quadlets. Typically, the first quadlet will contain the destination and the last quadlet will contain the header CRC. The header packet is followed by a data block which consists of a plurality of data quadlets with the last quadlet being a data CRC quadlet. The packet header in the first quadlet thereof contains a transaction code which defines the packet type of a primary packet. The transaction packet code specifies the packet format and the type of transaction that shall be performed. This could be such things as a write request for a data quadlet, a write request for a data block, read requests for data quadlets and data blocks, and read responses for data quadlets and data blocks. The asynchronous data packet noted above with respect to FIG. 4 is a primary data packet.

Figure 7:
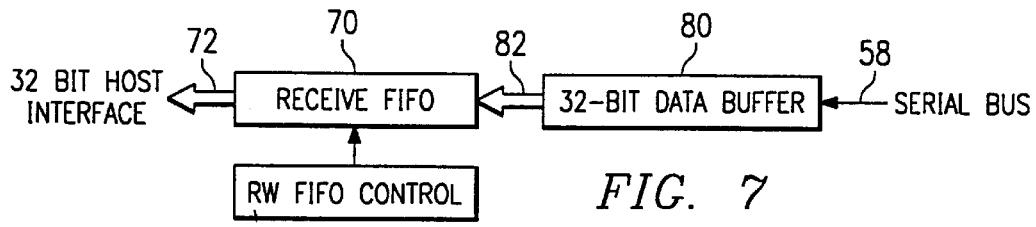
FIG. 7 illustrates a simplified block diagram of the received FIFO.

Referring now to FIG. 7, there is illustrated a simplified block diagram of the conversion of data on the serial bus 58 to a format storable in the FIFO 70, which is a receive FIFO. The physical layer 54 and link layer 52 all provide the functionality of providing a 32-bit data buffer 80. This is essentially a serial-to-parallel converter which converts the serial data into a parallel 32-bit word which can then be transferred over a bus 82 for storage in the receive FIFO 70. As noted hereinabove, the data is typically transmitted in bytes, which means that the buffer 80 receives the bytes of data over the bus 60 from the link layer 52 and stores them as a 32-bit word for transfer to the receive FIFO 70. The host interface bus 72 is operable to control the read and write operations and the various positions of the read and write pointers, as will be described in more detail hereinbelow.

Figure 8:
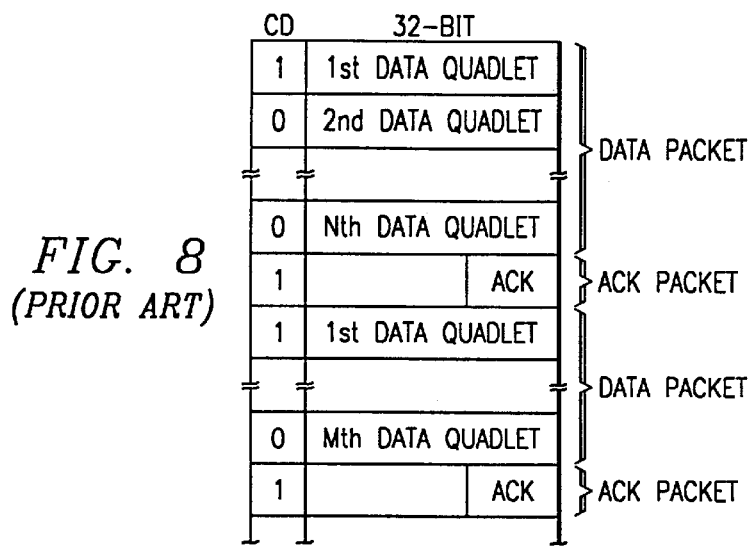
FIG. 8 illustrates a data map for a prior art FIFO configuration.

Referring now to FIG. 8, there is illustrated a map of a prior art configuration for the receive FIFO 70. In the configuration illustrated, each data quadlet has associated therewith a control data bit (CDB) that is set equal to a logic "1" for the first data quadlet in the packet and for the last data quadlet in the packet, with the intermediate data quadlets having a logic "0" set as the CDB. The last quadlet stores primarily the acknowledgment signal and indicates the end of a data packet. At the end of the data packet, typically, there will be another data packet initiated with the CDB again set to a logic "1." It can be seen that the width of each data register in the FIFO is 33 bits, with the data quadlet occupying 32 bits of the register and the CDB occupying one bit. Therefore, there will be required a minimum of two read cycles to read both the control data bit and the data quadlet. This is required since the 32-bit host bus interface does not know the status of any receive packet until the last data quadlet is read which contains the acknowledge signal that is sent back to the transmit node. According to the IEEE 1394 standard for high-performance serial bus, the acknowledge packet (8-bits wide) will indicate whether there is a data CRC error or if the receive FIFO 70 ran out of space.

Referring now to FIG. 9, there is illustrated a diagrammatic view of the register map for the receive FIFO 70 that operates in accordance with the present invention. In this embodiment, there are provided two data packets, a three data quadlet packet and a two data quadlet packet. In accordance with the first embodiment, the first register location associated with the data packet has stored therein a packet token with the CDB set equal to a logic "1." The CDBs for the remaining three data quadlets in the first data packet are set to a logic "0." The packet token in this embodiment consists of a field 90 that is associated with the number of quadlets within the data packet and an ack field 92 for the acknowledge data. Therefore, it can be seen that it is only necessary for the host system to first read the packet token and store the necessary information in a receive FIFO status register 94.

In order to read the information in the FIFO, the Read pointer of the FIFO will be incremented in a normal fashion. However, since the width of the FIFO is 33-bits, the system bus will not accommodate the entire width of the register during a single Read operation. Therefore, a separate bus (not shown) is provided for the CDB and for other information such as the quad count information and the value of the complete list, such that when the Read pointer is pointing to a particular location, the CDB location to the pointed-to-location will be output on the direct wired bus in addition to the quad count information and complete list information. This is directly input to a receive FIFO status register 94 in a defined location therein. Therefore, the Read sequence will require first examining the status register 94 by reading the contents thereof onto the host bus. Since the status register has a defined address, this will require a separate Read operation from that of the FIFO. Once this is read, the CDB will determine whether this is a packet token. If so, then the next Read operation will be that of the packet token which will be transferred to the host bus, this being a 32-bit transfer. This will require reading the contents of the FIFO location pointed to, and then incrementing the Read point. Therefore, each Read operation requires that the data in the register be transferred and then the Read pointer incremented. As such, there will be required two Read operations if the entire contents of the 33-bit location need to be evaluated. With the use of the present invention, only a single Read operation is required after the packet token is read, since the CDB is assumed to be "0" for all of the remaining locations defined by the quad count.

Thereafter, it is only necessary to read the next three sequential registers, i.e., increment the Read pointer by one with each associated read, without the necessity of reading the CD bit, i.e., requiring only a single read per quadlet. Once all of the data quadlets have been read in accordance with the quadlet count, the next read will be a full read of the 33-bit register, which should be another packet token.

In accordance with another embodiment of the present invention, the packet token may contain a whole receive packet in association therewith or part of a receive packet. To reduce the probability of sending a busy acknowledge signal back to the transmit node, a "trigger size" can be utilized to partition a large receive packet into several blocks of data. The data size is limited by the trigger size. Each time the trigger size is reached, or the "end of packet" indication is reached, a "packet token" quadlet is created. This packet token is illustrated in FIG. 10, it consisting of a CD bit 96, a quad count field 98, a Complete field 100, and an ack field 102. The Complete field 100 indicates whether the quad count in field 98 will take the read pointer to the end of the data packet. The ack field 102 is associated only with the last packet token within a given packet, as will be described hereinbelow.

Referring now to FIG. 11, there is illustrated a diagrammatic view of the register map for the FIFO 70 with a trigger size 4. There is illustrated a single data packet having ten data quadlets and three packet tokens 104, 106 and 108. The first packet token has a CDB set equal to "1," the quad count set equal to "4" and the Complete bit set equal to "0." This is followed by four data quadlets, each with the CDB set equal to "0." At the end of the last data quadlet, the packet token 106 is reached which also is identical to the packet token 104, since four data quadlets will follow. Since this is a ten data quadlet packet, there will be two additional data quadlets to be handled. In the packet token 108, the quad count in field 98 is set equal to "2," and the Complete bit is set equal to "1." In addition, the ack field 102 is filled. This will be followed by the last two data quadlets. If, during storage of the data in the FIFO 70, it became full, the operation could be interrupted and a busy acknowledge sent back to the transmit node.

Referring now to FIG. 12, there is illustrated a diagrammatic view of, the FIFO 70 illustrating how the pointers are manipulated to read and write information. To write data, a write pointer is required, which write pointer must be incremented for each write operation. A shadow pointer is also provided, which will shadow the write pointer. Initially, the shadow pointer and the write pointer are equal to each other. However, before the first write operation, the write pointer will be incremented by one to reserve the location pointed to by the shadow pointer for later storage of the packet token, and the shadow pointer will remain. The shadow pointer constitutes merely a bookmark to point to the packet token write location. In essence, this constitutes a reservation of the first location associated with the data packet or a partition. The assigning of the write pointer value to the shadow pointer is a confirm operation. However, the packet token could be located anywhere, as long as there is some type of pointing device to indicate where the packet token is such that it can be read prior to reading a data packet. The preferred embodiment is to have it the beginning of a packet or at the beginning of a partition in as packet.

Figure 13:
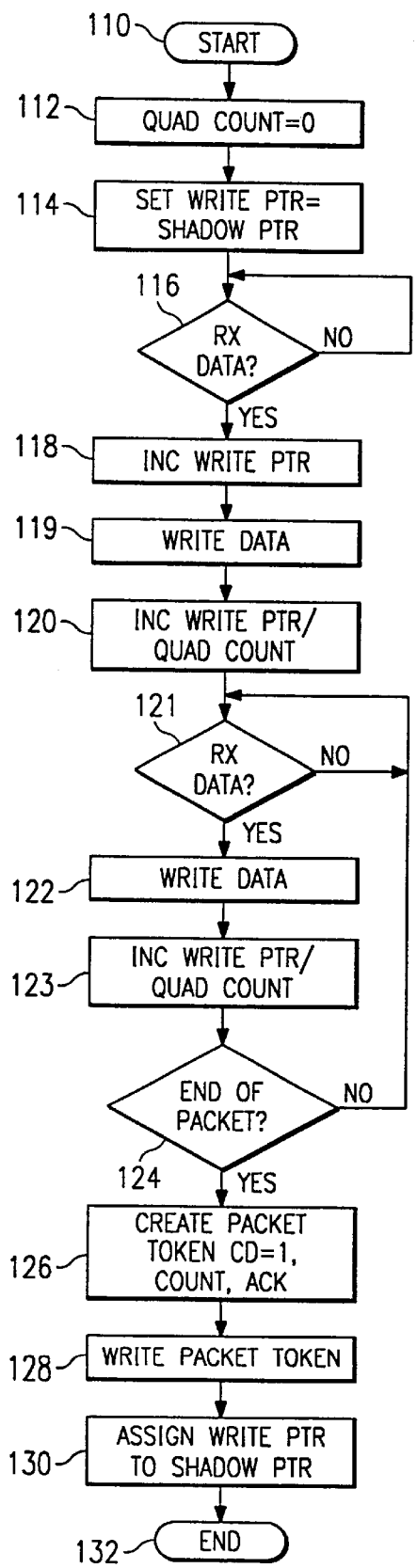
FIG. 13 illustrates a flow chart depicting the write operation in the FIFO for one embodiment.

Referring now to FIG. 13, there is illustrated a flow chart depicting the write operation for the initial embodiment of FIG. 9. The program is initiated at a start block 110 and then proceeds to a function block 112 to set the quad count equal to zero and then to a function block 114 to set both the write pointer and the shadow pointer equal to the same value. The program then flows to a decision block 116 to determine if data has been received. If not, the program will flow around a loop back to the input thereof. Once data has been received, the program will flow along a "Y" path to a function block 118 to increment the write pointer. The program then will flow to a function block 119 to write data to the location pointed to by the write pointer and then to a function block 120 to increment the write pointer and the quad count. The program will then flow to a decision block 121 to determine if additional data has been received, this being the next location or the second location. If not, the program will flow along a "N" path back to the input of decision block 116. If so, the program will flow along the "Y" path to a function block 122 in order to write data to the pointed-to location and then to a function block 123 to increment the write pointer and quad count value. [Decision block 122 loops back along the "N" path to the input thereof.] The program will then flow to a decision block 124 to determine if the packet read is the end of packet quadlet. If not, the program will flow along an "N" path back to the input of the decision block 121 to again wait for the next quadlet of data to be received. This will continue until the last data quadlet has been received in the packet, at which time the program will flow along the "Y" path from the decision block 124 to a function block 126 to create the packet token with the CDB set equal to "1," the quad count stored and an acknowledge signal generated. The program then flows to a function block 128 wherein the packet token will be written to the location pointed to by the shadow pointer. The program then flows to a function block 130 wherein the write pointer is assigned to the shadow pointer, i.e., the shadow pointer now is set to the previous value of the write pointer at the bottom of the previous packet. The program will then flow to an End block 132.

Figure 14:
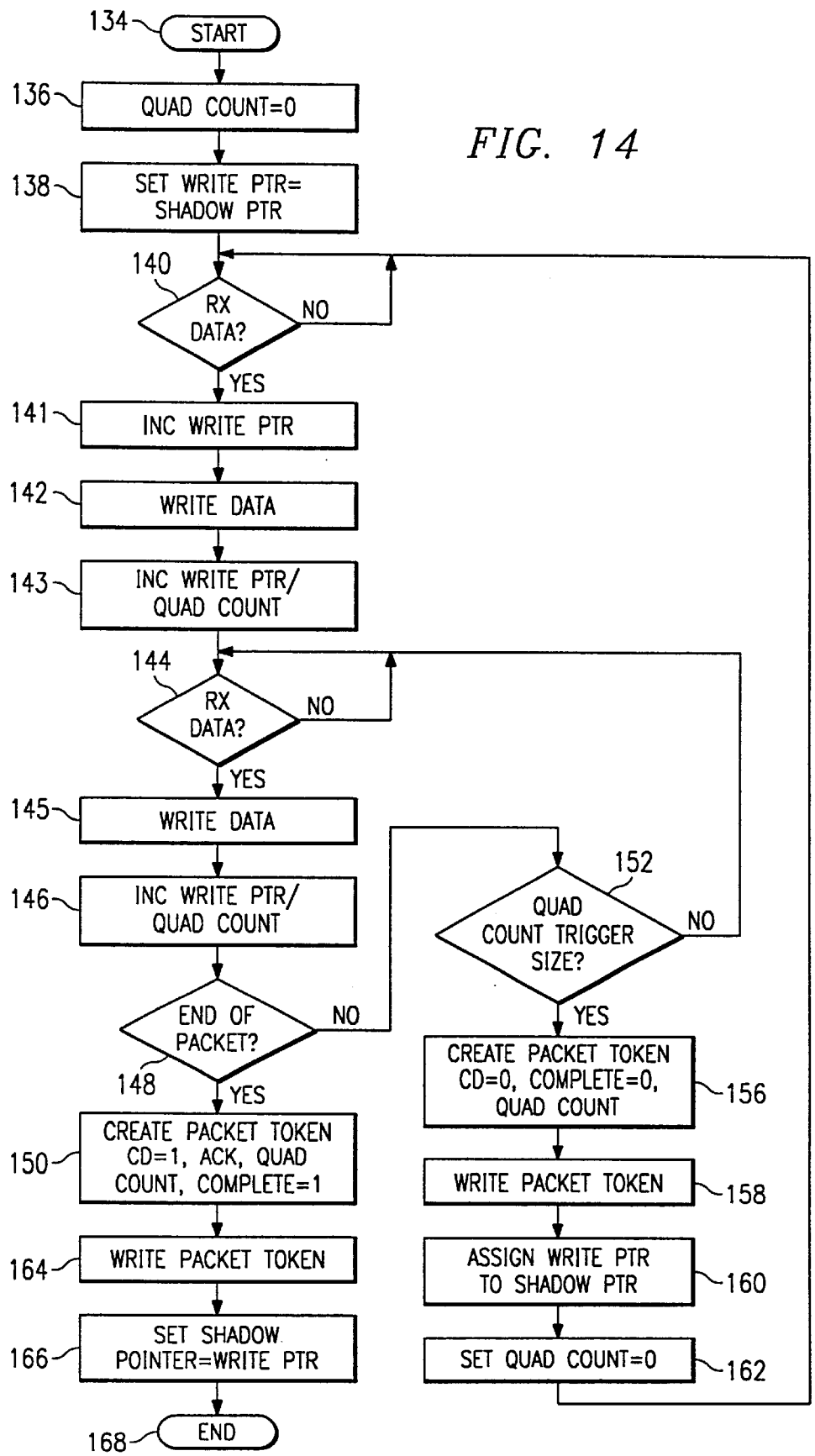
FIG. 14 illustrates a flow chart depicting the write operation for an alternate embodiment.

Referring now to FIG. 14, there is illustrated a flow chart depicting the write operation with partitions or "trigger sizes." The program is initiated at a start block 134 and then proceeds to a function block 136 to set the quad count equal to zero. The program then flows to a function block 138 to set the write pointer equal to the value of the shadow pointer. The program then flows to a decision block 140 to determine if data has been received. The program will then flow along the "N" path back to the input of the decision block 140 until it has been received, at which time it will then flow along the "Y" path to a function block 141 to increment the write pointer; this being the reservation operation for the later created packet. The program will then flow to a function block 142 in order to write data to the new location, this being the first packet or data quadlet. The program will then flow to a function block 143 to increment the write pointer and the quad count. The program will then flow to a decision block 144 to determine if data has been received. If not, the program will flow back along the "N" path to the input of the decision block 144 until data has been received, at which time it will flow along a "Y" path to a function block 145 to write data to the pointed-to location. The program will then flow to a function block 146 to increment the write pointer and the quad count. The program will then flow to a decision block 148 to determine if the data quadlet read is an end of packet quadlet. If yes, the program will flow along a "Y" path to a function block 150 and, if not, the program will flow to a decision block 152 to determine if the quad count is equal to the trigger size. If not, the program will continue along an "N" path back to the input of decision block 144 to read the next data quadlet. Once all of the data quadlets in a particular partition have been stored, i.e., the quad count is equal to the trigger size, the program will flow along a "Y" path to a function block 156 to create a packet token with the CDB set equal to "0," the Complete bit set equal to "0" and the quad count set equal to the trigger size. The program then flows to a function block 158 to write the packet token to the reserved location pointed to by the shadow pointer, and then to a function block 160 to assign the write pointer and value to the shadow pointer. The program then flows to a function block 162 to set the quad count equal to "0," and then the program flows back to the input of decision block 140 to initiate a read for the next data quadlet.

When the end of packet has been reached, the program will flow from the decision block 148 along the "Y" path to the function block 150 to set the write pointer equal to the value of the shadow pointer, and then to a function block 164 to create a packet token having the CDB set equal to "1," the quad count set equal to the number of quadlets contained therein, and the Complete bit set equal to "1." The acknowledgment signal is generated and stored therein also. The program will then flow to a function block 166 to write the packet token to the location pointed to by the shadow pointer and then assign the write pointer value to the shadow pointer, as indicated by a function block 164, and then to an End block 168.

Figure 15:
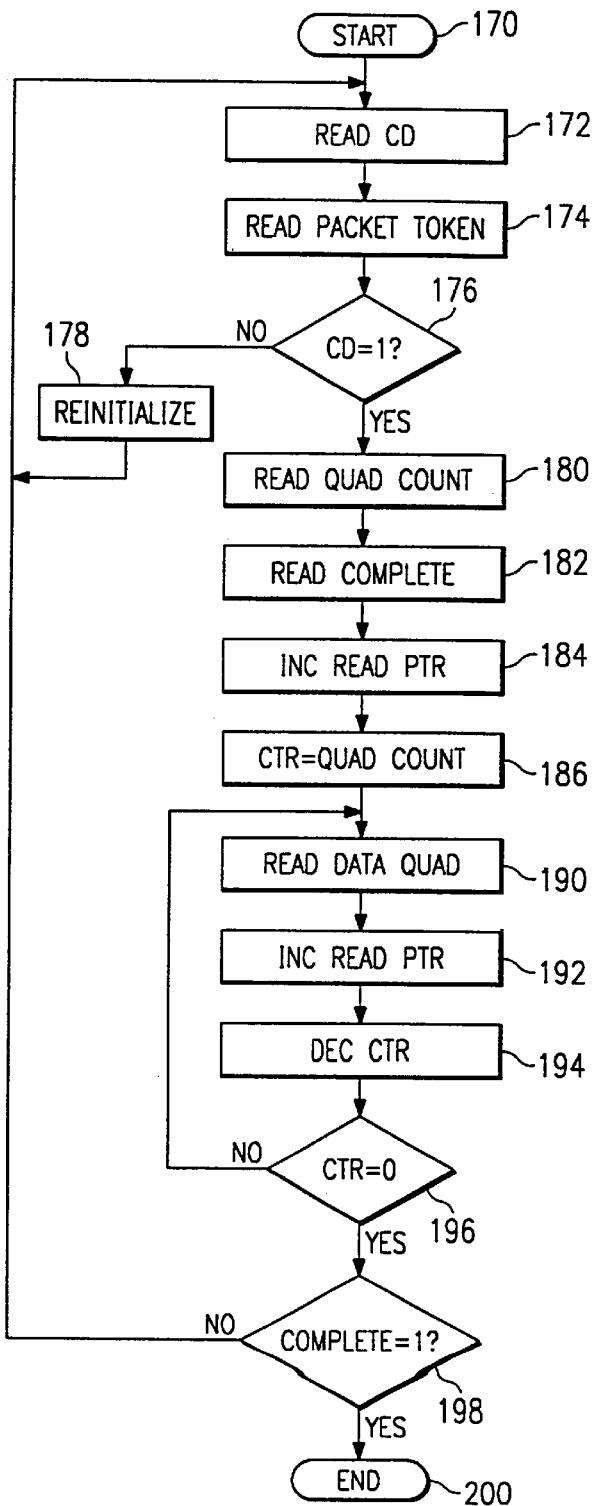
FIG. 15 illustrates a flow chart depicting a read operation of the FIFO.

Referring now to FIG. 15, there is illustrated a flow chart depicting the read operation by the host bus. The program is initiated at a start block 170, and then proceeds to a function block 172 to read the CD bit in a first read operation in the function block 172, and then to read the packet token in the next read cycle in a function block 174. The program then flows to a decision block 176 to determine if the CDB is set equal to "1" indicating a packet token. If not, the program will then flow to a function block 178 along an "N" path to reinitialize the system and then flows back to the input of function block 172. This reinitialize operation basically increments the read pointer until a CDB of "1" is found. If this is in fact a packet token, the program will flow along a "Y" path from decision block 176 to a function block 180 to read the quad count value from the packet token, and then to a function block 182 to read the value in the Complete field. This, of course, indicates whether this is the last packet to be read. The program then flows to a function block 184 to increment the read pointer, and then to a function block 186 to set the counter value equal to the quad count value. The program then flows to a function block 190 to read the contents of the quadlet and then to a function block 192 to increment the read pointer, and then to a function block 194 to decrement the counter value. The program them flows to a decision block 196 to determine if the count value is equal to zero. If not, it flows along the "N" path back to the input of function block 190 and reads the next data quadlet. The program then flows along a "Y" path to a decision block 198 to determine if the value in the Complete field was a "1." If not, this indicates that this was an intermediate partition, and the program will flow along the "N" path back to the input of the function block 172 to read the next packet token and the associated CDB. If this was the last partition, the program will flow along the "Y" path from function block 190 to an End block 200.

In summary, there has been provided a method and apparatus for reading and buffering data in an IEEE 1394 serial bus system. This involves storing each data quadlet in a register within a FIFO, which register includes both the data quadlet and also a control data bit. Each data quadlet is stored such that the initial register associated with a packet of data has associated therewith information as to how many data quadlets are contained within the packet. The control data bit is set to a "1" for this register value, which is referred to as a "packet token." Once the packet token has been read, the number of data quadlets in the packet is known, and the system need only increment the read pointer by the defined number of increments and read operations to read all of the data quadlets in a packet. The packet token will thereby define the last data quadlet to be read. After the last data quadlet is read, the next register contains the acknowledge signal.

Although the preferred embodiment has been described in detail, it should be understood that various changes, substitutions and alterations can be made therein without departing from the spirit and scope of the invention as defined by the appended claims.

What is claimed is:

1. A method for buffering received packetized data from a serial bus, comprising the steps of:
   recognizing the initiation of receipt of a given data packet;
   initiating the storage of the received data from the packet in a first packet data storage location in a FIFO;
   storing subsequent received data from the given packet in additional packet data storage locations in the FIFO as they are received;
   recognizing the receipt of the end of the given packet of data;
   generating a packet token having information contained therein as to the packet data storage locations within the FIFO associated with the packet data; and
   storing the packet token in the FIFO in such a manner that, upon reading a packet of data by a host system from the FIFO, the packet token will be read first to provide information to the host system as to the packet data storage locations of the remaining data in the stored packet.

2. The method of claim 1, wherein the step of storing said subsequent received data after the step of initiating is done in a sequential manner such that sequential and adjacent packet data storage locations in the FIFO are utilized for all of the data in the given data packet.

3. The method of claim 2, wherein the step of storing the packet token comprises storing the stored packet token in a packet data storage location immediately preceding the first packet data storage location associated with the given packet, requiring the step of first reserving a storage location in the sequence and, after generating the packet token, storing the packet token in the reserved packet data storage location.

4. The method of claim 1, wherein the width of a packet data storage location in the FIFO for storing packet data is equal to the host bus system data width to which the FIFO is interfaced for subsequent reading therefrom.

5. The method of claim 4, wherein the width of the FIFO is greater than the width of the portion therein for storing data associated with the received data packet, with the excess width reserved for control data as a control data portion, and further comprising generating control data for each packet data storage location indicating whether the packet data storage location is associated with the first packet data storage location in the received data packet, the last packet data storage location in the received data packet, or an intermediate packet data storage location in the received data packet, and wherein access of each packet data storage location by the host bus system requires a first read operation to read the control data from the control data portion, and a second read operation to read the associated packet data storage location.

6. The method of claim 5, wherein the step of storing subsequent received data comprises storing the subsequent received data in sequential and adjacent packet data storage locations with respect to the initial storage of the received data in the first packet data storage location and, prior to the step of initializing the storage of the received data, reserving a reserve packet data storage location for the packet token and storing the packet token in the reserved packet data storage location at the beginning of the sequence of packet data storage locations after generating the packet token.

7. The method of claim 6, wherein the last packet data storage location associated with the packet of received data contains information relating to the receipt of the data packet, which information is utilized for transmission back to the source of data.

8. The method of claim 5, wherein the portion of each packet data storage location for storing data is a multiple of a data quadlet.

9. The method of claim 8, wherein the portion of each packet data storage location for storing data has a width of four data quadlets.

10. The method of claim 5, wherein receipt of the data packet is divided into a plurality of receive segments comprising a defined number of packet data storage locations, and the step of generating the packet comprises generating a packet token after each segment, the packet token having information contained therein as to the number of packet data storage locations within the FIFO preceding the generation of the packet token and whether the packet token was generated at the end of receipt of the packet with the last of the generated packet tokens containing information as to the number of stored locations associated therewith if less than the total in a potential receive segment.

11. The method of claim 1, wherein each storage location has associated therewith a control field and a data field, the control field indicating the relative position of a packet data storage location within a stored data packet wherein the packet token comprises the initial packet data storage location for a given stored data packet and the data field containing packet data.

12. The method of claim 11 and further comprising the step of reading the stored data packet, the step of reading requiring a first read operation to read the control field, and a second read operation to read the data field wherein two read operations are required to read the packet token and, after reading the packet token and determining the number of packet data storage locations within the FIFO associated with the packet token, incrementing the read operation to each of the packet data storage locations with a single read per packet data storage location for the remaining data fields in the data packet.

13. A FIFO for buffering received packetized data from a serial bus, comprising:
   a plurality of packet data storage locations arranged in a given sequence as a FIFO;
   a write pointer for determining the packet data storage location to which data is written;
   a read pointer for determining the packet data storage location from which data is to be read;
   a FIFO controller for recognizing the initiation of receipt of a given packet of data, said controller setting said write pointer to a first packet data storage location in said FIFO and storing received data therein with subsequent received data being stored in additional packet data storage locations in said FIFO, said controller operable to generate a packet token upon recognizing the receipt of the end of a given packet of data, which packet token has stored therein information as to the packet data storage locations within the FIFO associated with the data packet, said controller operable to store said packet token in the FIFO in such a manner that, upon reading a packet of data by a host system from the FIFO, the packet token will be read first to provide information to the host system as to the packet data storage location of the remaining data in the stored packet.

14. The FIFO of claim 13, wherein the packet data storage locations associated with a received data packet are sequential and adjacent to each other for the given received data packet.

15. The FIFO of claim 14, wherein the packet data storage location in which the packet token is stored comprises the packet data storage location immediately preceding the first packet data storage location in the data packet.

16. The FIFO of claim 13, wherein the width of a packet data storage location in the FIFO for storing data is equal to the host bus system data width to which the FIFO is interfaced for subsequent reading therefrom, such that a single read operation is required to read the contents of a packet data storage location.

17. The FIFO of claim 16, wherein the width of the FIFO is greater than the width of a portion therein for storing data associated with a received data packet, the excess width reserved for control data as a control data portion of the FIFO, and the controller further operable to generate control data for each packet data storage location for storage in said control data portion indicating whether the packet data storage location is associated with the first packet data storage location in the received data packet, the last packet data storage location in the received data packet, or an intermediate packet data storage location in the received data packet, and wherein access to each packet data storage location by the host bus system requires a first read operation to read the control data from the control data portion and a second read operation to read the associated data packet storage location, and wherein the host system need only read the location associated with the packet token to determine which packet data storage locations are required to be read to retrieve the data associated with the stored data packet without reading the control data portion for each location.

18. The FIFO of claim 17, wherein the packet data storage locations are adjacent to each other and sequentially arranged for each stored data packet and, prior to initiating storage of a data packet, reserving a first packet data storage location for the packet token, and pointed to with a shadow pointer, wherein the write pointer is set to the shadow pointer at the end of receipt of the data packet, such that the packet token, after generation thereof, can be stored at the new location of the write pointer.

19. The FIFO of claim 18, wherein the last packet data storage location associated with the packet of received data contains information relating to the receipt of the data packet, which information is utilized for transmission back to the source of the data.

20. The FIFO of claim 17, wherein the portion of each packet data storage location for storing, data is a multiple of the data quadlet.

21. The FIFO of claim 20, wherein the portion of each packet data storage location for storing data has a width of four data quadlets.

* * * * *